(12) United States Patent
Morris

(10) Patent No.: US 8,207,362 B2
(45) Date of Patent: *Jun. 26, 2012

(54) BIO-FUEL AND PROCESS FOR MAKING BIO-FUEL

(75) Inventor: Martin Allan Morris, Monticello, IL (US)

(73) Assignee: Bio-Alternative, LLC, Covington, IN (US)

( * ) Notice: Subject to any disclaimer, the term of this patent is extended or adjusted under 35 U.S.C. 154(b) by 380 days.

This patent is subject to a terminal disclaimer.

(21) Appl. No.: 12/275,736

(22) Filed: Nov. 21, 2008

(65) Prior Publication Data

US 2010/0043280 A1    Feb. 25, 2010

Related U.S. Application Data

(63) Continuation-in-part of application No. 11/891,910, filed on Aug. 13, 2007, now Pat. No. 7,553,982.

(51) Int. Cl.
*C11C 3/00* (2006.01)
*C10L 1/18* (2006.01)

(52) U.S. Cl. .......... 554/169; 554/161; 554/163; 44/308; 44/307; 44/385

(58) Field of Classification Search .................. None
See application file for complete search history.

(56) References Cited

U.S. PATENT DOCUMENTS

| | | | |
|---|---|---|---|
| 5,578,090 A | 11/1996 | Bradin | |
| 6,127,560 A | 10/2000 | Stidham et al. | |
| 6,440,057 B1 | 8/2002 | Ergun et al. | |
| 6,642,399 B2 | 11/2003 | Boocock | |
| 6,979,426 B2 | 12/2005 | Teall et al. | |
| 7,145,026 B2 | 12/2006 | Fleisher | |
| 7,321,052 B2 | 1/2008 | Miller et al. | |
| 7,553,982 B1 | 6/2009 | Morris | |
| 2003/0167681 A1 | 9/2003 | Delgado Puche et al. | |
| 2007/0056213 A1 | 3/2007 | French et al. | |
| 2007/0197412 A1 | 8/2007 | Carter | |
| 2007/0283619 A1 | 12/2007 | Hillion et al. | |

OTHER PUBLICATIONS

International Search Report and Written Opinion for Application No. PCT/US09/64946 dated Jan. 20, 2010 (11 pages).

A Biodiesel Primer: Market & Public Policy Developments, Quality Standards & Handling—Prepared by Methanol Institute and International Fuel Quality Center (Apr. 2006).

United States Office Action for U.S. Appl. No. 11/891,910 dated Sep. 18, 2008.

*Primary Examiner* — Yate K Cutliff

(74) *Attorney, Agent, or Firm* — Thomas C. Meyers; Brown Rudnick LLP

(57) ABSTRACT

A method of producing biodiesel from a source of triglycerides. The source of triglycerides is reacted with a blended alcohol composition in the presence of a catalyst to form a mixture of at least one fatty acid alcohol ester and glycerin. The fatty acid alcohol ester is then separated from the glycerin and is purified to produce a biofuel. The blended alcohol composition comprises at least one lower alcohol, a ketone and ethyl acetate. The use of the blended alcohol composition allows the transesterification process to proceed under ambient temperature and pressure conditions within a relatively short reaction time.

13 Claims, No Drawings

BIO-FUEL AND PROCESS FOR MAKING BIO-FUEL

RELATED APPLICATIONS

This application is a continuation in part of U.S. patent application No. 11/891,910, filed Aug. 13, 2007, which is incorporated herein by reference in its entirety.

FIELD OF THE INVENTION

The present invention relates to an improved process for making bio-diesel and a blended alcohol reaction composition for use in the process.

BACKGROUND OF THE INVENTION

Bio-diesel is the name given to a variety of ester-based oxygenated fuels made from vegetable oils, fats, greases and other sources of triglycerides. Bio-diesel is a clean-burning diesel replacement fuel that can be used in compression ignition (CI) engines and is manufactured from renewable non-petroleum-based sources, including but not limited to, organic fats and oils such as virgin vegetable oil, recycled oil, such as used fryer oil and grease trap materials, and animal fats, such as lard and beef tallow. Non-limiting examples of these feedstocks include soybean oil, peanut oil, coconut oil, palm oil, canola or rapeseed oil, algae oil, jatropha oil, animal fat tallow, waste vegetable grease, and other similar sources.

The basic biodiesel reaction involves a transesterification process to convert triglycerides in the feed stock to methyl esters. The transesterification process typically involves the reaction of a raw oil (source of triglycerides) with methanol or ethanol and an alkaline catalyst such as sodium hydroxide or potassium hydroxide. Excess methanol is typically used to ensure that the process is driven to completion.

The alcohol and catalyst are mixed first and then the alcohol/catalyst mixture is mixed with the raw oil and allowed to react. Once the reactants are thoroughly mixed, the reaction begins and the raw oil begins to separate into methyl ester and glycerin (otherwise known as glycerol). Because the methyl ester is less dense than the glycerin, it floats to the top of the glycerin and may be separated from the glycerin by pumping it off the top or by draining the glycerin off the bottom. A centrifuge or other separation means may also be used to separate the methyl ester from the glycerin by-product. Thereafter, the methyl ester is purified to produce the bio-diesel product.

Bio-diesel is produced in pure form (100% biodiesel or "B100"), but is typically blended with conventional diesel at low levels between about 2% (B2) and about 20% (B20) in the U.S. and may be blended at higher levels in other parts of the world. While B2 biodiesels fuels may be used in conventional diesel engines without modification, higher level blends above approximately B5 (and up to B100) may require special handling and fuel management as well as vehicle modifications such as the use of heaters (especially in colder climates) and different seals/gaskets that come into contact with the fuel. The level of care needed depends on a variety of factors, including, but not limited to the engine, manufacturer, climate conditions, among others.

Bio-diesel has been designated an alternative fuel by the U.S. Department of Energy and the U.S. Department of Transportation, and is registered with the U.S. Environmental Protection Agency as a fuel and fuel additive. It can be used in any diesel engine (when blended with conventional diesel) and is compatible with existing petroleum distribution infrastructure.

Specifications for biodiesel have been implemented in various countries around the world. In the U.S., the specifications have been implemented through the American Society of Testing and Materials (ASTM). The ASTM specification for diesel is ASTM D975 and the ASTM standard for biodiesel is ASTM D6751. It is noted that the standard for biodiesel is as a blendstock for blending into conventional diesel and is not meant to be a specification for B100 alone. It is noted that both No. 1 and No. 2 petroleum diesel fuel (i.e., D1 and D2) may be blended with biodiesel for various reasons, including the need for lower temperature operation.

One of the problems with the conventional transesterification process used to produce bio-diesel is that the reaction produces approximately ten percent glycerin as a byproduct, which must be separated and removed from the methyl ester to produce the biodiesel product. Thus, it would be desirable to utilize a process that produces less glycerin as a byproduct.

Another problem with the conventional transesterification process is that the process must be conducted at elevated temperature (above approximately 130° F.) and elevated pressure (above approximately 20 PSI). Furthermore, the reaction time needed to proceed to completion can also be lengthy. As described for example in U.S. Pat. No. 7,145,026 to Fleisher, the subject matter of which is herein incorporated by reference in its entirety, the transesterification reaction can require many hours to proceed under atmospheric conditions. Fleisher describes a process that operates at a temperature of 80 to 180° C. in order to reduce the reaction time.

However, it is desirable to develop a process that can be conducted under ambient temperature and pressure and that can proceed to completion within a short period of time (i.e., between 10 and 20 minutes) under such ambient conditions.

SUMMARY OF THE INVENTION

It is an object of the present invention to provide an improved method of manufacturing biodiesel.

It is another object of the present invention to provide a method of manufacturing biodiesel that produces less glycerin as a by-product.

It is still another object of the present invention to provide a method of manufacturing biodiesel that can proceed to completion quickly under ambient conditions.

It is still another object of the present invention to provide a method of manufacturing biodiesel in a quick and economical manner as compared to traditional bio-diesel production.

To that end, the present invention relates generally to an improved method of producing biodiesel comprising the steps of:
 a) providing a source of triglycerides;
 b) mixing a blended alcohol composition with a catalyst;
 c) reacting the source of triglycerides with the blended alcohol composition and catalyst to form a mixture of at least one fatty acid alcohol ester and glycerin;
 d) separating the at least one fatty acid alcohol ester from the glycerin; and
 e) optionally, purifying the at least one fatty acid alcohol ester to produce a bio-fuel.

The present invention also relates generally to an improved blended alcohol composition for use in the process of the invention. The improved blended alcohol composition typically comprises:
 a) about 96 to about 98% of at least one lower alcohol;
 b) about 1 to about 3% of a ketone; and
 c) about 1 to about 3% ethyl acetate.

DETAILED DESCRIPTION OF THE PREFERRED EMBODIMENTS

The present invention involves an improved chemical process for producing a bio-fuel (biodiesel) and for an improved blended alcohol composition for use in the process. The inventors have surprisingly discovered that the use of the blended alcohol composition of the invention reduces the amount of glycerin produced as a by-product in the process by approximately 50% or more. In some embodiments, it is possible to reduce the amount of glycerin produced to less than 1%. The process still undergoes a transesterification reaction but can be performed at production speeds without the use of chemical reactors and at room temperature within about 10-15 minutes. The process of the invention does not need any additional pressure, cavitation or ultrasonic devices that are typically needed by other reactor devices to proceed at these speeds. Thus, the transesterification process of the invention can proceed quickly at room temperature and under normal (i.e., ambient) pressure.

In one embodiment, the present invention relates generally to a method of producing biodiesel fuel comprising the steps of:
 a) providing a source of triglycerides;
 b) mixing a blended alcohol composition with a catalyst;
 c) reacting the source of triglycerides with the blended alcohol reaction composition and catalyst to form a mixture of at least one fatty acid alcohol ester and glycerin;
 d) separating the at least one fatty acid alcohol ester from the glycerin; and
 e) optionally, purifying the at least one fatty acid alcohol ester to produce a bio-fuel.

Both batch and continuous systems may be used to produce biodiesel fuel in accordance with the present invention. For example a batch system may typically comprise a simple mixing tank with a mixer and preferably a heater and upper and lower extraction ports. In the alternative, a continuous system may be used which would typically comprise a closed reactor with a mixer, heating means and a centrifuge. The inventors of the present invention note that the systems described herein are given by way of example and not limitation and that other similar systems may also be used in the practice of the invention.

The source of triglycerides may be any of the conventionally used sources of triglycerides, including but not limited to soybean oil, peanut oil, coconut oil, palm oil, canola oil, rapeseed oil, algae oil, jatropha oil, animal fat tallow, waste vegetable oil and combinations of one or more of the foregoing. In one embodiment, the source of triglycerides comprises virgin soybean oil.

One of the benefits of the process of the invention is that a purification step is not required, and in most instances, once the biodiesel reaction has occurred the biodiesel can simply be separated from the by-product. If a purification step is desired, this step of purifying the fatty acid alcohol ester typically comprises water washing the fatty acid alcohol ester one or more times. However, any conventional methods of purifying the fatty acid alcohol ester known to those skilled in the art may also be used, including, but not limited to the use of Magnasol®, ion exchange, and distillation.

The catalyst is typically selected from the group consisting of sodium hydroxide, potassium hydroxide, lithium hydroxide, sodium methylate, potassium methylate and combinations of one or more of the foregoing. In one preferred embodiment, the catalyst comprises potassium hydroxide.

The step of separating the fatty acid alcohol ester from the glycerin may be accomplished by centrifuging the mixture for a period of time sufficient to separate the fatty acid alcohol ester and the glycerin. Other conventional separation means may also be used as would generally be known to those skilled in the art and include, for example, settling.

The reaction (or transesterification) step is beneficially accomplished at a temperature within the range of about 40 and about 130° F., and more preferably within the range of about 65 and about 85° F. However, it is most desirable to carry out the step of transesterifying the mixture at ambient temperature and pressure.

At the ambient temperature and pressure conditions described herein, the reaction step typically proceeds to completion within a reaction time of about 15 to about 20 minutes. The inventors have found that if the temperature used is too high (above about 130° F.), then the reaction proceeds too rapidly and poorer results are achieved. Thus, it is generally preferably to select a suitable temperature and pressure so that a desired reaction rate of about 10 to 20 minutes is achieved.

The novel blended alcohol composition of the invention typically comprises:
 a) about 96 to about 98% of at least one lower alcohol;
 b) about 1 to about 3% of a ketone; and
 c) about 1 to about 3% ethyl acetate.

In one embodiment, the at least one lower alcohol comprises a mixture of methanol and ethanol and in some embodiments, the mixture of methanol and ethanol comprises about 3 to about 5% methanol and about 95 to about 97% ethanol. However, mixtures of other lower alcohols may be used in the practice of the present invention. As used herein, lower alcohols refer to alcohols with carbon chains (straight or branched) of less than 4 carbons. A non-limiting list of lower alcohols usable in the practice of the invention includes methanol, ethanol, butanol and propyl alcohols.

While it is generally preferable that the ketone be one of methyl isobutyl ketone and methyl ethyl ketone, and combinations thereof, other similar ketones would also be usable in the practice of the invention, including but not limited to acetone and acetoacetate. In one preferred embodiment, the ketone is methyl isobutyl ketone.

The inventors have found that the use of the novel blended alcohol composition in the transesterification process of the invention (in place of the methanol or other lower alcohol used in the prior art) allows the reaction to proceed under more beneficial conditions, i.e., ambient temperature and pressure, and proceeds at a faster rate and produces a biodiesel product with less glycerin produced as a byproduct. The inventors have found that the use of the blended alcohol composition of the invention reduces by half the amount of glycerin produced in the process.

While not wishing to be bound by theory, the inventors believe that the use of ethyl acetate keeps the reaction at room temperature and that the use of the ketone as a chemical mediator prevents glycerin from forming, i.e., the ketone does not allow carbon to form the necessary bonds to produce glycerin so the result is that less glycerin is produced.

During the transesterification process, most prior art processes create three mono alkyl esters, which are either methyl or ethyl esters. In addition, this reaction also produces about 10-11% glycerin as a waste product. In the transesterification reaction of the present invention, four mono alkyl esters are created, including both methyl and ethyl esters. It is believed that the use of the ketone interrupts the formation of glycerin and allows the fourth mono alkyl ester to be created. This then allows all of the input materials to become a consumable product, resulting in an improved conversion to the biodiesel product.

The transesterification process proceeds as follows:

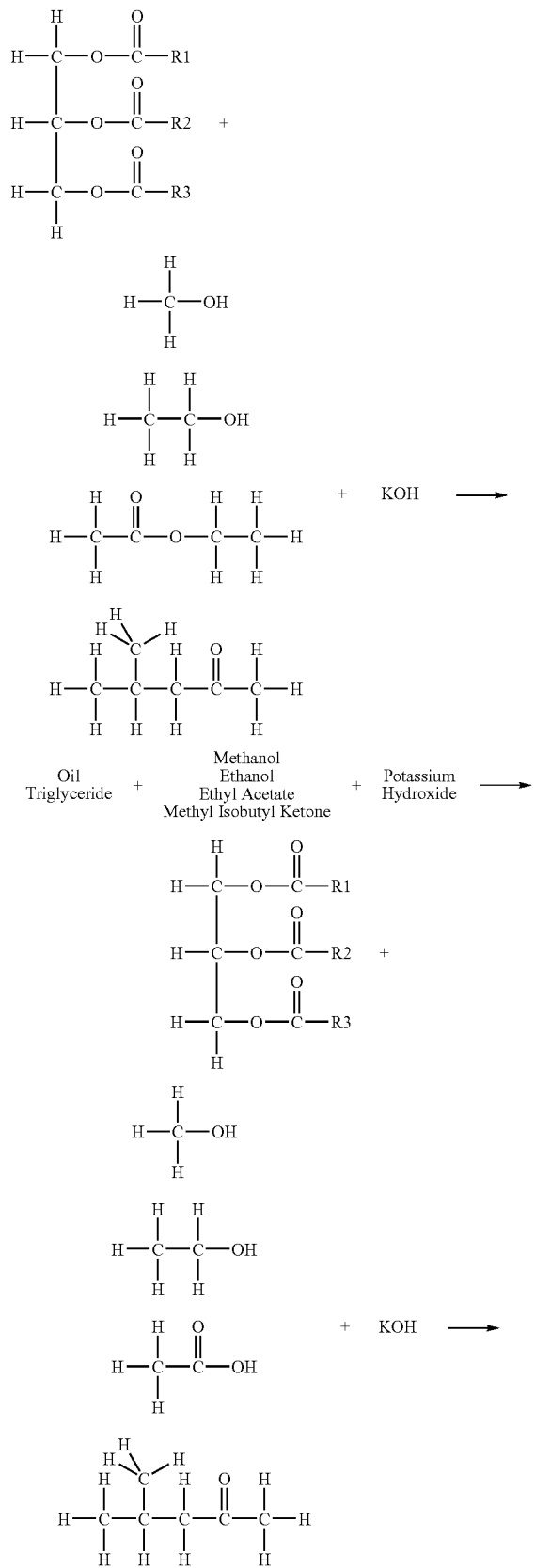

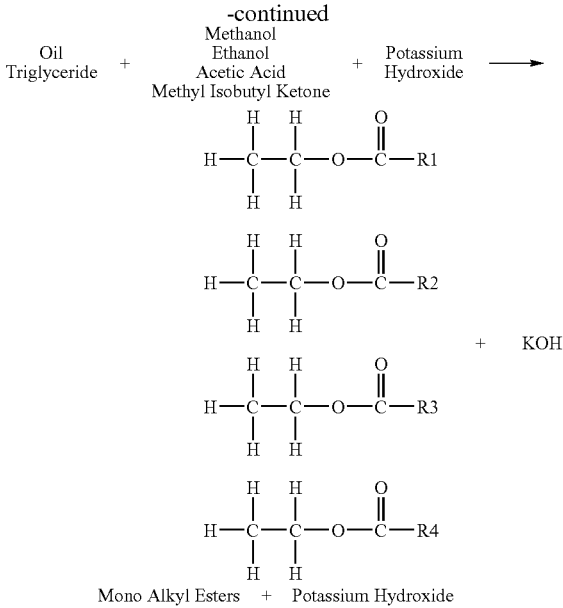

The present invention is illustrated by reference to the following non-limiting examples:

EXAMPLE 1

One liter of soybean oil was reacted with 275 milliliters of the blended alcohol composition with 14 grams of potassium hydroxide dissolved in it and stirred vigorously until the desired color change was apparent. The mixture was then allowed to sit at room temperature for approximately 10 minutes without agitation. Upon reaching the maximum cloud point, the mixture is placed in a separation container and allowed to separate into the biodiesel and the byproduct. If faster separation rates are desired, the mixture may be centrifugally separated once maximum cloud point has been reached.

Cloud point is significant in the U.S. because biodiesels produced from different feedstocks may perform differently in different geographic regions and climates. Cloud point is performed as part of ASTM 6751 testing to characterize the low temperature operability of diesel fuel. It defines the temperature at which a cloud or haze appears in the fuel under prescribed test conditions. The cloud point for biodiesel blends is generally higher than it is for petroleum diesel fuel.

EXAMPLE 2

45 gallons of soybean oil are reacted with 13.5 gallons of the blended alcohol composition with 74 ounces of potassium hydroxide dissolved in it. The mixture is reacted in a tank by mixing all of the ingredients by pump agitation and a mixing blade. The mixture is then mixed vigorously for 1-2 minutes and allowed to set for about 20 minutes without agitation. After setting for the desired time period, the mixture is run through a centrifuge. Once the centrifuge has separated the biodiesel from the byproduct, the biodiesel is purified by water washing.

A one gallon sample of this material was subjected to ASTM D6751 testing and passed.

While the invention has been described above with reference to specific embodiments thereof, it is apparent that many changes, modifications, and variations can be made without departing from the inventive concept disclosed here. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A method of producing biodiesel fuel comprising the steps of:
   a) providing a source of triglycerides;
   b) providing a blended alcohol composition comprising about 3 to about 5% methanol and about 95 to about 97% ethanol, a ketone, and a catalyst;
   c) reacting the source of triglycerides with the blended alcohol composition at a temperature within the range of about 40 to about 130° F. to form a mixture of at least one fatty acid alcohol ester and glycerin;
   d) separating the at least one fatty acid alcohol ester from the glycerin; and
   e) optionally, purifying the at least one fatty acid alcohol ester to produce a bio-fuel.

2. The method according to claim 1, wherein the source of triglycerides is selected from the group consisting of soybean oil, peanut oil, coconut oil, palm oil, canola oil, rapeseed oil, algae oil, jatropha oil, animal fat tallow, waste vegetable oil and combinations of one or more of the foregoing.

3. The method according to claim 2, wherein the source of triglycerides comprises virgin soybean oil.

4. The method according to claim 1, wherein the step of purifying the fatty acid alcohol ester comprises water comprises washing the fatty acid alcohol ester at least once.

5. The method according to claim 1, wherein the catalyst is selected from the group consisting of sodium hydroxide, potassium hydroxide, sodium methylate, potassium methylate and combinations of one or more of the foregoing.

6. The method according to claim 5, wherein the catalyst comprises potassium hydroxide.

7. The method according to claim 1, wherein the step of separating the fatty acid alcohol ester from the glycerin comprises centrifuging the mixture for a period of time sufficient to separate the fatty acid alcohol ester and the glycerin.

8. The method according to claim 1, wherein step (c) is accomplished at a temperature within the range of about 65 to about 85° F.

9. The method according to claim 1, wherein step (c) is accomplished at ambient pressure.

10. The method according to claim 1, wherein step (c) proceeds to completion within about 15 to about 20 minutes.

11. The method according to claim 1, wherein the mixture is allowed to sit at room temperature for about 10-20 minutes without agitation prior to the separation step.

12. The method according to claim 1, wherein the ketone is selected from the group consisting of methyl ethyl ketone, methyl isobutyl ketone and combinations thereof.

13. The method of claim 1, wherein the method produces less than 1% glycerin (volume of glycerin per volume of fatty acid alcohol ester).

* * * * *